US008454023B2

(12) United States Patent
Samudrala et al.

(10) Patent No.: US 8,454,023 B2
(45) Date of Patent: Jun. 4, 2013

(54) RETRACTABLE SEAL SYSTEM

(75) Inventors: Omprakash Samudrala, Niskayuna, NY (US); Siddarth Kumar, Niskayuna, NY (US); Gregory A. Crum, Mauldin, SC (US); Karimulla Shaik Sha, Karnataka (IN)

(73) Assignee: General Electric Company, Niskayuna, NY (US)

( * ) Notice: Subject to any disclaimer, the term of this patent is extended or adjusted under 35 U.S.C. 154(b) by 41 days.

(21) Appl. No.: 13/104,069

(22) Filed: May 10, 2011

(65) Prior Publication Data

US 2012/0286476 A1 Nov. 15, 2012

(51) Int. Cl.
*F01D 11/02* (2006.01)
*F16J 15/44* (2006.01)

(52) U.S. Cl.
USPC .......................... 277/411; 277/416; 277/422

(58) Field of Classification Search
USPC .................. 277/355, 411, 412, 413, 416, 422
See application file for complete search history.

(56) References Cited

U.S. PATENT DOCUMENTS 3,294,243 A * 12/1966 Cerles .......................... 210/402
4,436,311 A * 3/1984 Brandon ...................... 277/413
5,074,748 A * 12/1991 Hagle ........................ 415/170.1
5,192,084 A * 3/1993 Norbury ...................... 277/355
5,395,124 A * 3/1995 Brandon ...................... 277/413
5,794,942 A * 8/1998 Vance et al. ................. 277/303
6,022,027 A 2/2000 Chevrette et al.
6,105,967 A * 8/2000 Turnquist et al. ............ 277/355
6,131,911 A * 10/2000 Cromer et al. ............... 277/355
6,173,962 B1 1/2001 Morrison et al.
6,244,599 B1 * 6/2001 Braun et al. ................. 277/352
6,250,641 B1 6/2001 Dinc et al.
6,394,459 B1 5/2002 Florin
6,402,157 B1 * 6/2002 Zhou et al. ................... 277/355
6,435,514 B1 * 8/2002 Aksit et al. ................... 277/355
6,502,823 B1 1/2003 Turnquist et al.
6,533,284 B2 * 3/2003 Aksit et al. ................... 277/355
6,655,696 B1 12/2003 Fang et al.
6,669,203 B1 * 12/2003 Mortzheim .................. 277/355
6,715,766 B2 4/2004 Kirby, III et al.
6,736,597 B2 * 5/2004 Uehara et al. ............. 415/174.2
6,779,799 B2 * 8/2004 Tong et al. .................... 277/411
6,786,487 B2 * 9/2004 Dinc et al. .................... 277/355
6,790,001 B2 * 9/2004 Turnquist et al. .......... 415/174.2
6,840,519 B2 * 1/2005 Dinc et al. .................... 277/413
6,951,339 B2 * 10/2005 Turnquist et al. ............ 277/628
6,969,231 B2 * 11/2005 Ghasripoor et al. ....... 415/173.4
6,976,680 B2 * 12/2005 Uehara et al. ................ 277/355
6,997,677 B2 2/2006 Munshi et al.

(Continued)

OTHER PUBLICATIONS

Cheski et al., Title: "A Large Steam Turbine Retrofit Design and Operation History", Power-Gen International Conference, Date: Dec. 6, 2005, Las Vegas, NV.

(Continued)

*Primary Examiner* — Vishal Patel
*Assistant Examiner* — L. Susmitha Koneru
(74) *Attorney, Agent, or Firm* — Ann M. Agosti

(57) ABSTRACT

The present application thus provides a retractable seal system for use between a high pressure side and a low pressure side of a turbine engine. The retractable seal system may include a seal positioned in a slot of a stationary component, a pressure balance pocket positioned about the seal, and a conduit in communication with the pressure balance pocket and the high pressure side.

12 Claims, 4 Drawing Sheets

U.S. PATENT DOCUMENTS

| | | | | |
|---|---|---|---|---|
| 7,032,903 | B1 | 4/2006 | Dalton et al. | |
| 7,066,470 | B2 | 6/2006 | Turnquist et al. | |
| 7,168,708 | B2 | 1/2007 | Dalton et al. | |
| 7,201,560 | B2 | 4/2007 | O'Clair et al. | |
| 7,344,357 | B2 * | 3/2008 | Couture et al. | 415/174.2 |
| 7,438,526 | B2 * | 10/2008 | Enderby | 415/231 |
| 7,578,509 | B2 * | 8/2009 | Grondahl | 277/355 |
| 7,731,478 | B2 | 6/2010 | Chevrette et al. | |
| 7,976,026 | B2 * | 7/2011 | Verma et al. | 277/355 |
| 2003/0102630 | A1 * | 6/2003 | Dinc et al. | 277/355 |
| 2003/0178779 | A1 * | 9/2003 | Wright et al. | 277/355 |
| 2005/0012275 | A1 * | 1/2005 | Nakano et al. | 277/411 |
| 2005/0098958 | A1 * | 5/2005 | Ebert et al. | 277/355 |
| 2005/0206087 | A1 * | 9/2005 | Hogg et al. | 277/355 |
| 2006/0033285 | A1 * | 2/2006 | Nishimoto et al. | 277/355 |
| 2007/0132192 | A1 | 6/2007 | Chevrette | |
| 2007/0243062 | A1 | 10/2007 | Chevrette et al. | |
| 2007/0257445 | A1 | 11/2007 | Mortzheim et al. | |
| 2008/0042363 | A1 * | 2/2008 | Hashiba et al. | 277/355 |
| 2008/0169616 | A1 * | 7/2008 | Awtar et al. | 277/593 |
| 2009/0196742 | A1 | 8/2009 | Turnquist et al. | |
| 2009/0315272 | A1 * | 12/2009 | Kasahara et al. | 277/355 |
| 2010/0078893 | A1 | 4/2010 | Turnquist et al. | |
| 2010/0239415 | A1 | 9/2010 | Turnquist et al. | |
| 2010/0327534 | A1 | 12/2010 | Powar et al. | |
| 2011/0072831 | A1 * | 3/2011 | Tanimura | 60/805 |

OTHER PUBLICATIONS

Grondahl, Title: "Pressure Actuated Leaf Seals for Improved Turbine Shaft Sealing", 41st AIAA/ASME/SAE/ASEE Joint Propulsion Conference & Exhibit, Date: Jul. 10-13, 2005, Tucson, AZ.

Sulda, Title: "Retractable Brush Seal Optimizes Efficiency and Availability for Cycling and Baseloaded Steam Turbines", Power-Gen, Nov. 1, 1999, p. 1.

* cited by examiner

RETRACTABLE SEAL SYSTEM

TECHNICAL FIELD

The present application relates generally to turbine engines and more particularly relates to a pressure balanced, retractable seal system for limiting frictional forces about the seal for predictable operation, during transient events, over the life of the seal.

BACKGROUND OF THE INVENTION

Brush seals are commonly used to eliminate or minimize air leakage through a gap between parts or components that may be positioned adjacent to each other. For example, brush seals are positioned in rotating mechanisms such as turbine engines used for power generation and the like. Typically, the brush seals minimize the leakage between regions at different pressures on opposite sides of the seal. As a specific example, a brush seal may be used to minimize air leakage through the gap (or clearance) between a stationary component such as a stator and a rotating component such as a rotor. Brush seals are contact seals with bristles contacting the rotor surface so as to allow for a tight clearance and leakage reduction as compared to non-contact seals such as labyrinth seals and the like.

The bristles of a brush seal, however, may undergo substantial wear due to interference between the bristles and the rotor caused by thermal transients during, for example, turbine start up or shutdown. This wear may accumulate over a number of startups/shutdown cycles so as to reduce the leakage performance of the seal during steady state operations. Wear in the bristles generally correlates with an overall decrease in turbine efficiency and power output.

A retractable brush seal may eliminate the wear due to thermal interference during startup or shutdown by physically moving the seal away from the rotor. A retractable brush seal may be passively activated by means of leaf springs and the like that respond to the varying pressure differential across the seat. The retractable brush seal may be positioned in a high clearance position such that the increasing pressure deferential during startup deforms the leaf springs to move the seal closer to the rotor. Similarly during shutdown, the falling pressure differential causes the leaf springs to retract so as to move the seal away from the rotor. The retractable brush seal thus eliminates or reduces bristle/rotor interference so as to provide an increased component lifetime.

The retractable brush seal usually is mounted in a mating slot machined into the stator. The two hooks of the mating slot provide rigid support for leaf spring deformation during the motion of the retractable seal towards and away from the rotor. The pressure differential across the seal loads it against the aft support hook so as to form a gas joint that prevents bias leakage through the support hook. Over the operating life of the retractable brush seal, however, the coefficient of friction at a seal/hook contact surface may vary due to oxidation and corrosion of the mating parts as well as due to surface finish changes resulting from fretting or sliding wear between the parts. As a result, seal closure and retraction behavior may vary over time. Such changes may result in the seal not closing fully to the desired low clearance positioning during startup or not retracting before the thermal interference between the stator and rotor occurs during shutdown. The former may result in a significant performance reduction while the later may result in excessive seal wear or damage.

There is thus a desire for an improved retractable seal system that eliminates or reduces the impact of frictional forces on seal motion. Such an improvement should provide overall seal system predictability, reliability, and increased lifetime. Given such, overall leakage performance may be improved over the long term for increased overall turbine engine efficiency and power output.

SUMMARY OF THE INVENTION

The present application thus provides a retractable seal system for use between a high pressure side and a low pressure side of a turbine engine. The retractable seal system may include a seal positioned in a slot of a stationary component, a pressure balance pocket positioned about the seal, and a conduit in communication with the pressure balance pocket and the high pressure side.

The present application further provides a method of reducing friction at a contact surface between a neck of a seal and a hook of a stationary component of a turbine. The method may include the steps of positioning a pressure balance pocket about the contact surface, equalizing the pressure within the pressure balance pocket and a high pressure side of the seal, and moving the seal along the contact surface in response to a transient operation of the turbine.

The present application further provides a retractable seal system for use between a high pressure side and a low pressure side of a turbine engine. The retractable seal system may include a brush seal with a neck positioned about a pair of hooks of a slot of a stationary component, a pressure balance pocket positioned about the neck and one of the pair of hooks, and a conduit in communication with the pressure balance pocket and the high pressure side.

These and other features and improvements of the present application will become apparent to one of ordinary skill in the art upon review of the following detailed description when taken in conjunction with the several drawings and the appended claims.

DETAILED DESCRIPTION

Figure 1:
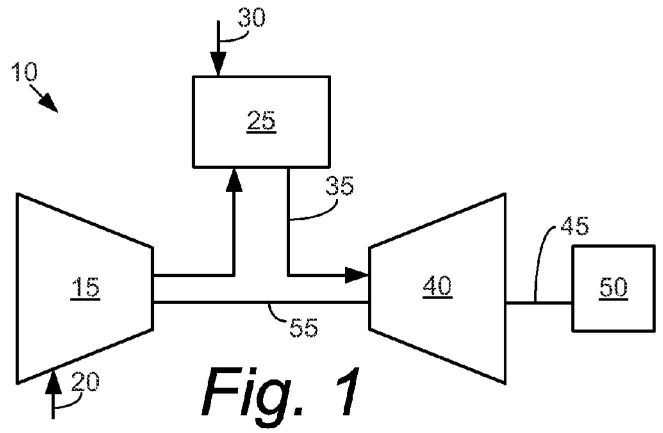
FIG. 1 is a schematic view of a gas turbine engine.

Referring now to the drawings, in which like numerals refer to like elements throughout the several views, FIG. 1 shows a schematic view of gas turbine engine 10 as may be described herein. The gas turbine engine 10 may include a compressor 15. The compressor 15 compresses an incoming flow of air 20. The compressor 10 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. As described above, the mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y. and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2A:
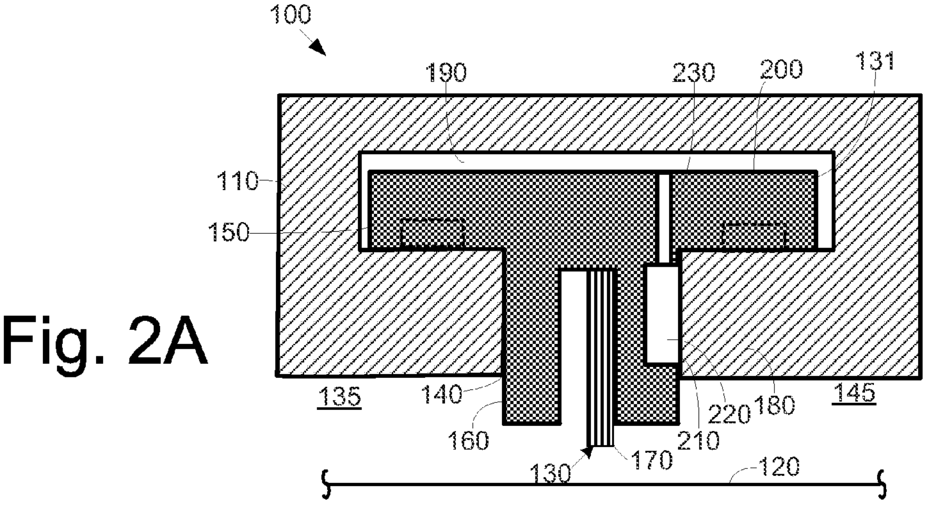
FIG. 2A is a side cross-sectional view of a retractable seal system as may be described herein.
Figure 2B:
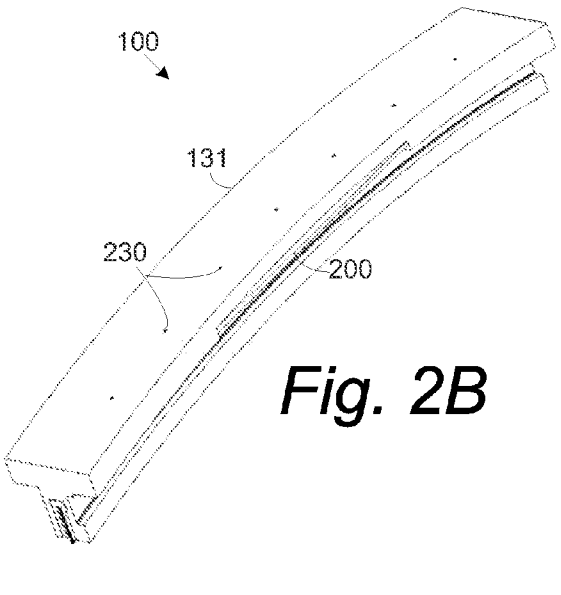
FIG. 2B is a perspective view of the retractable seal system of FIG. 2A.

FIGS. 2A and 2B show one example of a retractable seal system 100 as may be described herein. Similarly to that described above, the retractable seal system 100 seals between a stationary component 110 such as a stator and the like and a rotating component 120 such as a rotor and the like. Any type of stationary component 110 and rotating component 120 may be used herein. Other configurations and other components may be used herein.

The retractable seal system 100 may include a brush seal 130. The brush seal 130 may be mounted rigidly in a retractable seal holder 131 as is shown. Alternatively, the brush seal 130 may be shaped into the retractable seal holder 131 itself. The brush seal 130 may be positioned within a seal slot 140 of the stationary component 110 and extend towards the rotating component 120. The brush seal 130 may be positioned between a high pressure side 135 and a low pressure side 145. The seal holder 131 may include an upper flange 150 and an elongated neck 160. Additional flanges (or wings) also may be used to aid in preloading and the like. One or more bristles 170 may be mounted about the neck 160 and extend towards the rotating component 120. The bristles 170 may be made out of metal or other materials such as ceramics. Any number or size of the bristles 170 may be used. The flange 150 of the seal holder 131 may be positioned on a pair of hooks 180 formed by a groove 190 in the stationary component 110. A number of springs 200 may be positioned between the flanges 150 of the seal holder 131 and the hooks 180 formed about the seal slot 140. Other components and other configurations may be used herein. Although leaf springs are shown, any type of mechanical springs such as helical springs, disk springs and the like may be used to achieve the desired passive actuation.

As described above, the neck 160 of the seal holder 131 may be forced against the hook 180 on the low pressure side 145 at a contact surface 210. The coefficient of friction therebetween may impact on the overall performance of the retractable seal system 100. A pressure balance pocket 220 positioned on the neck 160 of the seal holder 131 aids in reducing the total friction force during seal motion. A flange conduit 230 may extend from the pressure balance pocket 220 through the flange 150 and into the groove 190. The conduit 230 may be extend radially, axially, or any other orientation in between. The pressure balance pocket 220 may be any type of internal space with any size, shape, or volume. Likewise, the conduit 230 may be any type of channel or hole connecting the pocket 220 with the groove 190. Other configurations and other components may be used herein.

The pressure inside the pressure balance pocket 220 thus may be equalized with the upstream pressure on the high pressure side 135 through the flange conduit 230. Specifically, the use of the pressure balance pocket 220 reduces the axial forces pushing against the seal holder 131 on the high pressure side which, in turn, pushes the neck 160 against the hook 180. Given such, the pressure balance pocket 220 reduces the impact of a changing coefficient of friction by reducing the frictional forces opposing the motion of the seal holder 131. Adequate frictional contact, however, is still maintained between the neck 160 and the hook 180 so as to prevent leakage along the contact surface 210.

Figure 3A:
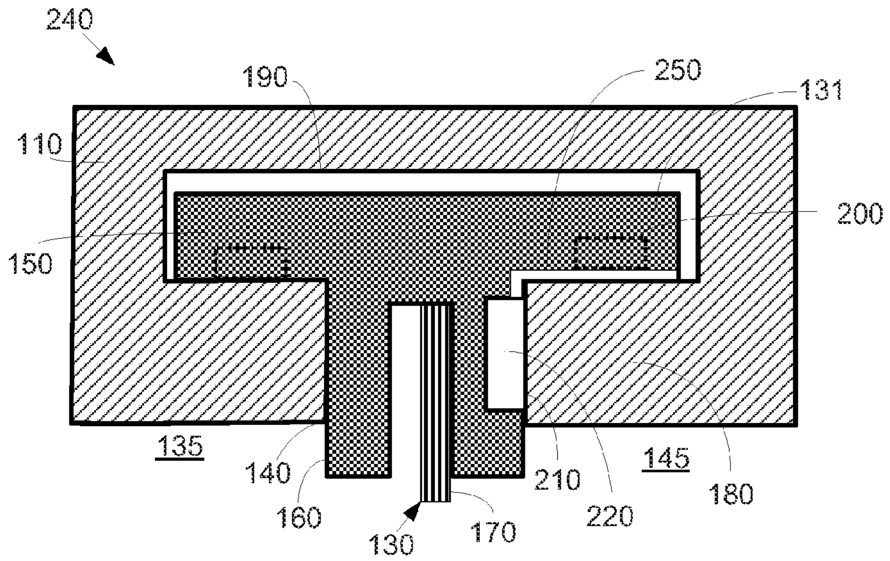
FIG. 3A is a side cross-sectional view of an alternative embodiment of a retractable seal system as may be described herein.
Figure 3B:
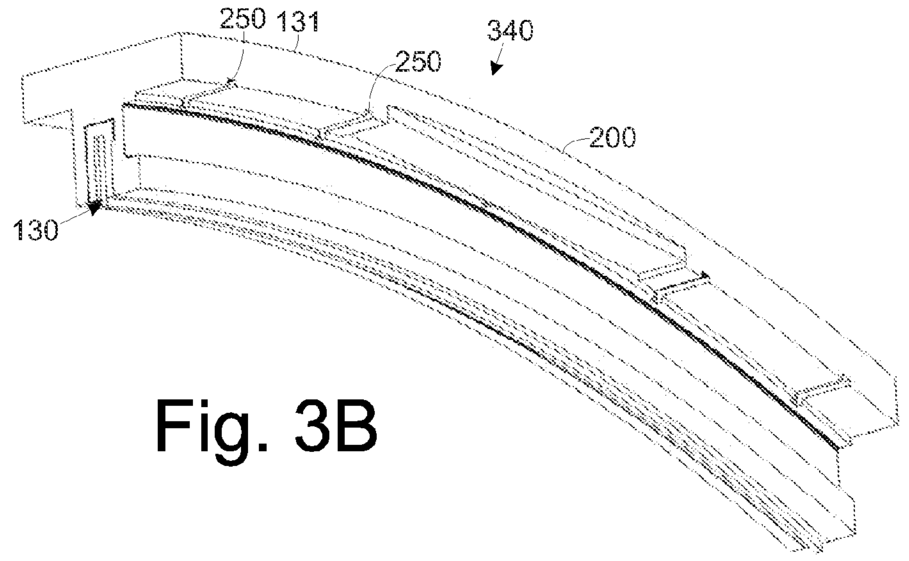
FIG. 3B is a perspective view of the retractable seal system of FIG. 3A.

FIGS. 3A and 3B show a further embodiment of a retractable seal system 240. In this embodiment, the pressure balance pocket 220 may be in communication with a flange groove 250. As is shown, the flange groove 250 may extend along the bottom of the flange 150 and into the side of the groove 190. Other configurations and other components may be used herein.

Figure 4:
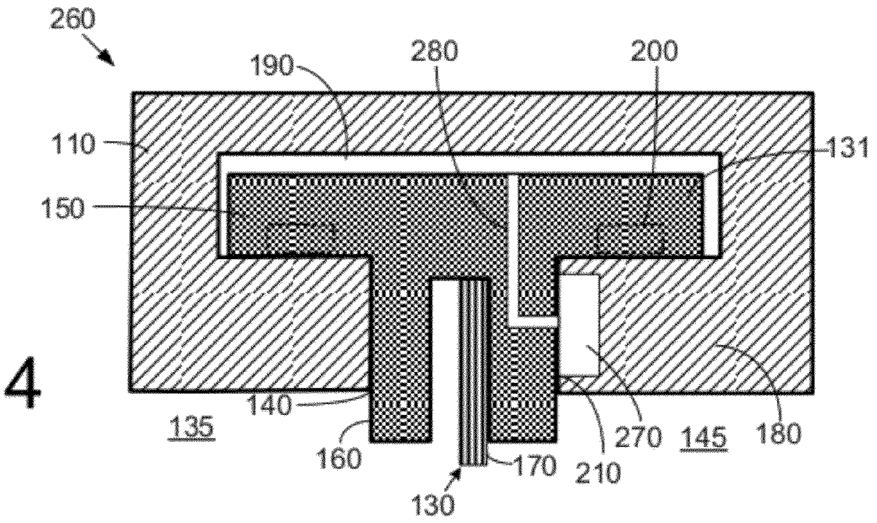
FIG. 4 is a side cross-sectional view of an alternative embodiment of a retractable seal system as may be described herein.

FIG. 4 shows a further embodiment of a retractable seal system 260. In this embodiment, a pressure balance pocket 270 may be positioned in one of the hooks 180. The pressure balance pocket 270 may be in communication with a flange conduit 280 that extends through the neck 160 and the flange 150 of the seal holder 131 and in communication with the groove 190. Other configurations and other components may be used herein.

Figure 5A:
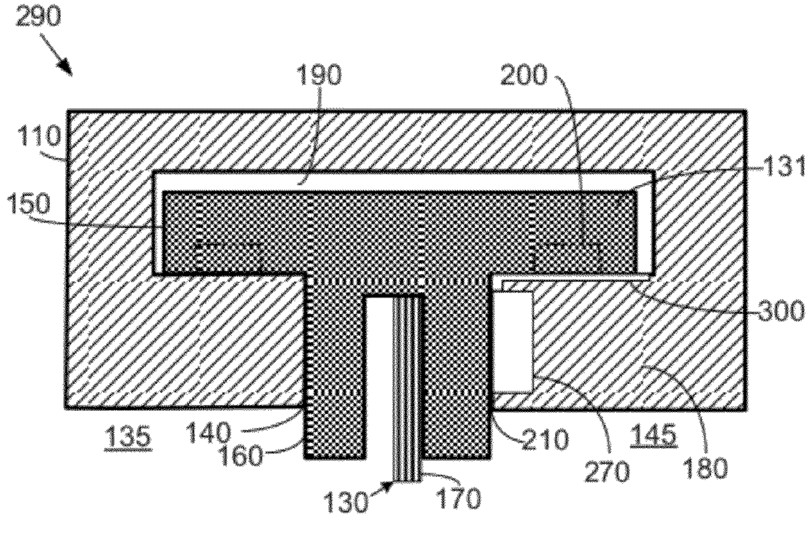
FIG. 5A is a side cross-sectional view of an alternative embodiment of a retractable seal system as may be described herein.
Figure 5B:
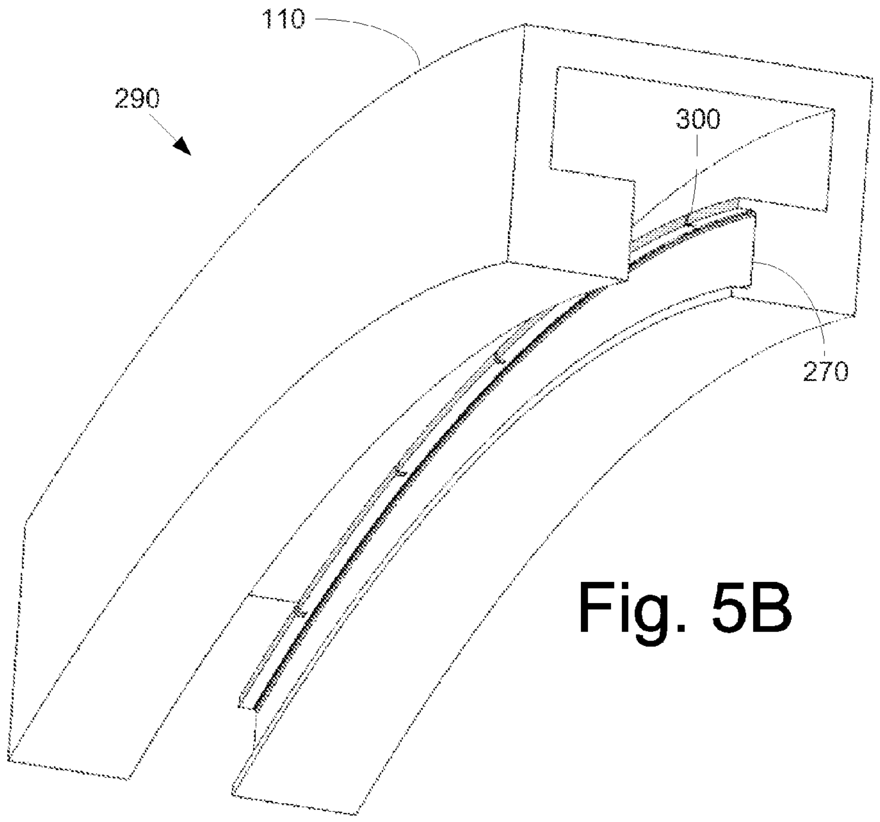
FIG. 5B is a perspective view of a portion of the retractable seal system of FIG. 5A.

FIGS. 5A and 5B shows a similar example of a retractable seal system 290. In this embodiment, the pressure balance pocket 270 is again positioned within the hook 180. The pressure balance pocket 270 is in communication with a hook groove 300 that extends along the length of the hook 180 adjacent to the flange 150 of the seal holder 131 and again towards the side of the groove 190. Other configurations and other components may be used herein.

The various embodiments of the retractable seal system described herein are for purposes of example only. The use of any type of pressure balance pocket about either the neck 160 of the brush seal 130 and/or the hook 180 and in communication the high pressure side 135 upstream thereof so as to reduce the pressure about the contact surface 210 may be used herein.

The use of the retractable seal system thus reduces the frictional force about the neck 160 and the hook 180 while maintaining a leak proof seal. The reduction in friction should increase the overall robustness of the seal and predictability of the seal over the operating lifetime. The equalization of the pressure therein thus results in seal motion being less sensitive to the frictional coefficients opposing seal motion during transient operations and the like. The retractable seal systems also reduce the potential for seal instabilities that may result in tilting or cocking of the seal. Overall performance and operating life of the seal should be improved by a reduction in bristle wear caused by thermal interference and the like.

Figure 6:
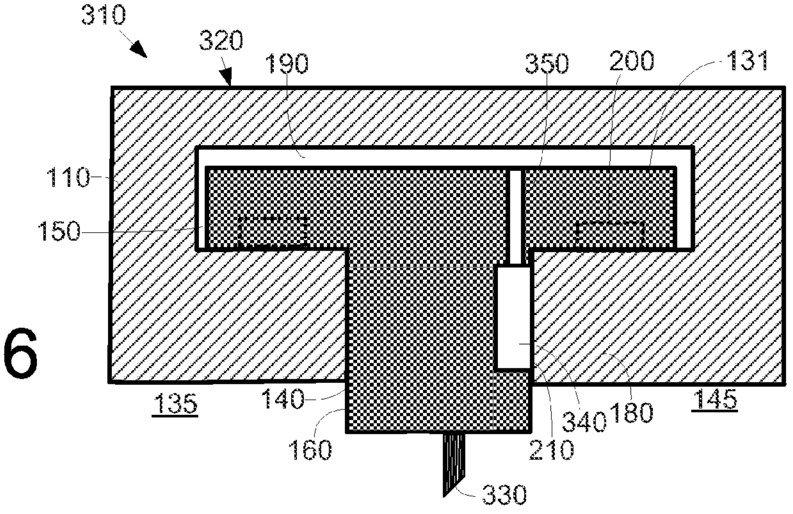
FIG. 6 is a side cross-sectional view of an alternative embodiment of a retractable seal system as may be described herein.

FIG. 6 shows a further embodiment of a retractable seal system 310. This embodiment shows the use of a labyrinth seal 320 with one or more labyrinth teeth 330. The labyrinth seal 320 may be used with a pressure balance pocket 340 and a conduit 350. The pressure balance pocket 340 may be positioned on the neck 160 or the hook 180. Likewise, the conduit 350 may extend through the flange 150 or as a groove along the flange 150 or the hook 180. Other configurations and other components may be used herein.

The retractable seal system described herein thus may be applicable to other types of rotor-stator seals in addition to brush seals and labyrinth seals. For example, packing rings, honeycomb seals, abradable seals, and the like may be used herein. Moreover, the retractable seal system may be used in many other gas or steam turbine locations and the like. The retractable seal system thus may be used between any type of stationary component 110 and any type of rotating component 120 in any desired location.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A retractable seal system for use between a high pressure side and a low pressure side of a turbine engine, comprising:

a seal positioned in a slot of a stationary component, wherein the seal comprises a neck positioned between a pair of hooks of the slot of the stationary component, an upper flange positioned on the pair of hooks within a groove of the stationary component, wherein the pair of hooks are formed by the groove, and one or more springs positioned about the stationary component and positioned in between the flange and the pair of hooks;

a pressure balance pocket positioned about the seal, wherein the pressure balance pocket is positioned within the neck; and a conduit in communication with the pressure balance pocket and the high pressure side.

2. The retractable seal system of claim 1, wherein the seal faces a rotating component.

3. The retractable seal system of claim 1, wherein the seal comprises a brush seal.

4. The retractable seal system of claim 3, wherein the brush seal comprises a plurality of bristles.

5. The retractable seal system of claim 1, wherein the pressure balance pocket is positioned within one of the pair of hooks.

6. The retractable seal system of claim 1, wherein the conduit comprises a flange conduit through a flange of the seal.

7. The retractable seal system of claim 1, wherein the conduit comprises a flange groove along a flange of the seal.

8. The retractable seal system of claim 1, wherein the conduit comprises a hook grove along a hook of the stationary component.

9. The retractable seal system of claim 1, wherein the seal comprises a labyrinth seal.

10. The retractable seal system of claim 9, wherein the labyrinth seal comprises one or more labyrinth teeth.

11. A retractable seal system for use between a high pressure side and a low pressure side of a turbine engine, comprising:

a brush seal positioned in a slot of a stationary component;

wherein the brush seal comprises a neck positioned about a pair of hooks of the slot of the stationary component, an upper flange positioned on the pair of hooks within a groove of the stationary component, wherein the pair of hooks are formed by the groove, and one or more springs positioned about the stationary component and positioned in between the flange and the pair of hooks;

a pressure balance pocket positioned about the neck and one of the pair of hooks; and a conduit in communication with the pressure balance pocket and the high pressure side, wherein the pressure balance pocket is positioned within the neck and in communication with the high pressure side via the conduit.

12. The retractable seal system of claim 11, wherein the brush seal comprises a plurality of bristles facing a rotating component.

* * * * *